US008683625B1

(12) United States Patent
Straub (10) Patent No.: US 8,683,625 B1
(45) Date of Patent: Apr. 1, 2014

(54) RETENTION CLIP FOR A SPRAY WAND HOSE

(76) Inventor: Lisa A. Straub, Forked River, NJ (US)

(*) Notice: Subject to any disclaimer, the term of this patent is extended or adjusted under 35 U.S.C. 154(b) by 768 days.

(21) Appl. No.: 12/887,345

(22) Filed: Sep. 21, 2010

(51) Int. Cl.
*E03C 1/244* (2006.01)

(52) U.S. Cl.
USPC .................................. 4/654; 4/661

(58) Field of Classification Search
USPC ...................... 4/619, 638, 654, 661
See application file for complete search history.

(56) References Cited

U.S. PATENT DOCUMENTS

| 5,675,847 | A | 10/1997 | Pierre |
| D390,643 | S | 2/1998 | Trueb et al. |
| D431,288 | S | 9/2000 | Helmsderfer |
| 6,234,192 | B1 * | 5/2001 | Esche et al. ............. 137/355.25 |
| 6,915,816 | B2 | 7/2005 | Nelson et al. |
| 7,143,780 | B1 | 12/2006 | Pitts |
| 7,328,717 | B1 | 2/2008 | Hertz |

* cited by examiner

*Primary Examiner* — Huyen Le
(74) *Attorney, Agent, or Firm* — Robert C. Montgomery; Montgomery Patent & Design (57) ABSTRACT

A device to prevent a sink sprayer hose from becoming caught on under sink plumbing, such as shut-off valves, is herein described. The device comprises a semi-circular shield and a hinged retaining mechanism mounted to an underside of a kitchen sink around shut-off valves and adjacent to the sink sprayer hose. It is held in place to the wall or cabinet surface via a foam adhesive tape. The sprayer hose rests against it, thus preventing it from becoming caught on the shutoff valve as it is withdrawn. This allows for full withdrawal of the hose and elimination of the aggravation that occurs when the hose becomes caught on the valve/piping that is present.

19 Claims, 8 Drawing Sheets

RETENTION CLIP FOR A SPRAY WAND HOSE

RELATED APPLICATIONS

The present invention was first described in a notarized Official Record of Invention on May 19, 2009, that is on file at the offices of Montgomery Patent and Design, LLC, the entire disclosures of which are incorporated herein by reference.

FIELD OF THE INVENTION

The present invention relates generally to spray hose retainers, and in particular, to a retention clip for a spray wand hose for use under a sink.

BACKGROUND OF THE INVENTION

Many kitchen sinks are equipped with a sprayer hose that pulls out from next to the faucet. It is typically used to clean off plates and cookware that are either too large or too cumbersome to clean with the water stream from the faucet. The hose for the sprayer is approximately three (3) feet long and hangs below the sink when not in use. As such, it is prone to becoming caught on objects as it is withdrawn from the sink, primarily on the handle of plumbing shut-off valves that protrudes from the wall. This forces the user to stop whatever they are doing in the sink, dry their hands, and crawl under the sink cabinet to correct the situation leading to increased frustration and aggravation. In addition to being an inconvenience, this interference and entanglement can cause damage to the plumbing fittings and to the hose if the user continues to pull on the hose without freeing it.

Various solutions have been presented to remedy these problems. Examples of these types of devices can be seen by reference in several U.S. patents. U.S. Pat. No. 5,675,847, issued in the name of Pierre, discloses an under-sink hose retainer having a "U"-shaped hose retainer with a hollow interior for storing the hose and mounted under the sink. U.S. Pat. No. 7,328,717, issued in the name of Hertz, discloses a plumbing valve cover for avoiding interference with a faucet hose having a bracket mounted under the sink to cover the plumbing valves.

While these devices may accomplish their specific intended purpose, each suffers from one or more disadvantage or deficiency with respect to design, function, or effectiveness. In particular, these devices do not provide an effective method of retaining the hose in a position away from the objects which interfere with the extension and return of the hose. Additionally, the sprayer hose may become caught on these devices and may get entangled with other under-sink objects.

Accordingly, there exists a need for a means by which hoses from sink sprayers can be kept free and untangled from under-sink protrusions and objects. The development of the present invention substantially departs from the conventional solutions and in doing so fulfills this need.

SUMMARY OF THE INVENTION

In view of the foregoing references, the inventor recognized the aforementioned inherent problems and lack in the art and observed that there is a need for a device which provides a simple and effective way to prevent sink sprayer hoses from become entangled with under-sink objects. Thus, the object of the present invention is to solve the aforementioned disadvantages and provide for this need.

Another object of the present invention is to provide a device which positions the spray hose away from under-sink plumbing or other under-sink objects that typically become snagged on the hose.

Yet another object of the present invention is to provide a device which retains the spray wand at the position away from under-sink plumbing or other under-sink objects that typically become snagged on the hose.

Yet another object of the present invention is to provide a device which is simple to mount at a desired location on a wall or cabinet underneath a sink basin.

Yet still another object of the present invention is to provide a device which is simple and intuitive to use with little to no training.

Yet still another object of the present invention is to provide a device which is durable and economical to manufacture.

One (1) or more of these and other objects of the invention are achieved by providing a retention clip device for a spray wand hose comprising a generally curved retainer for retaining the spray wand hose in a position away from under-sink plumbing to avoid entanglement with the plumbing as the spray wand hose is extended and returned and a generally curved mount secured to a vertical under-sink surface for removably attaching the retainer. The retainer includes an upper surface, a lower surface, an interior sidewall, and an exterior sidewall. The exterior sidewall provides an inwardly curved groove for receiving the spray wand hose. The mount includes a flat member having an upper surface and a lower surface.

In at least one embodiment these objects are achieved by providing the retainer having at least two mounting posts protruding from the lower surface and the mount having at least two (2) keyhole mounting apertures for removably receiving the mounting posts. The heads of the mounting posts are suitably sized to fit within the keyhole aperture upper sections and the shafts of the mounting posts are suitably sized to fit within the keyhole aperture lower sections.

The retainer also includes a latch disposed on an end portion for securing the spray wand hose to the retainer within said groove. The latch spans from the retainer upper surface to the retainer lower surface over the groove and is securable in a closed position.

These objects are also achieved by providing a method of retaining the spray wand hose in a position away from under-sink plumbing to avoid entanglement with the under-sink plumbing as the spray wand hose is extended and returned.

Further objects and advantages of the present invention will become apparent from a consideration of the drawings and ensuing description.

Furthermore, the described features and advantages of the invention may be combined in various manners and embodiments as one skilled in the relevant art will recognize. The invention can be practiced without one (1) or more of the features and advantages described in a particular embodiment.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

| | |
|---|---|
| 10 | retention clip for a spray wand hose |
| 11 | faucet |
| 12 | spray wand |
| 13 | spray wand hose |
| 14 | plumbing |
| 15 | interior surface |
| 20 | retainer |
| 21 | upper surface |
| 22 | lower surface |
| 23 | first post |
| 24 | groove |
| 25 | latch |
| 26 | hinge |
| 27 | second post |
| 28 | aperture |
| 30 | mount |
| 31 | mount upper surface |
| 32 | mount lower surface |
| 33 | key hole |
| 34 | adhesive foam pad |
| 35 | protective cover |
| 36 | adhesive surface |

DETAILED DESCRIPTION OF THE PREFERRED EMBODIMENT

The best mode for carrying out the invention is presented in terms of its preferred embodiment, herein depicted within FIGS. 1 through 8. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a retention clip for a spray wand hose (herein described as the "device") 10, which provides a semi-circular shield used to prevent a spray wand hose 13 from becoming entangled with plumbing features 14, such as shut-off valves or piping which are located in a cabinet interior surface 15 below a faucet 11.

Figure 1:
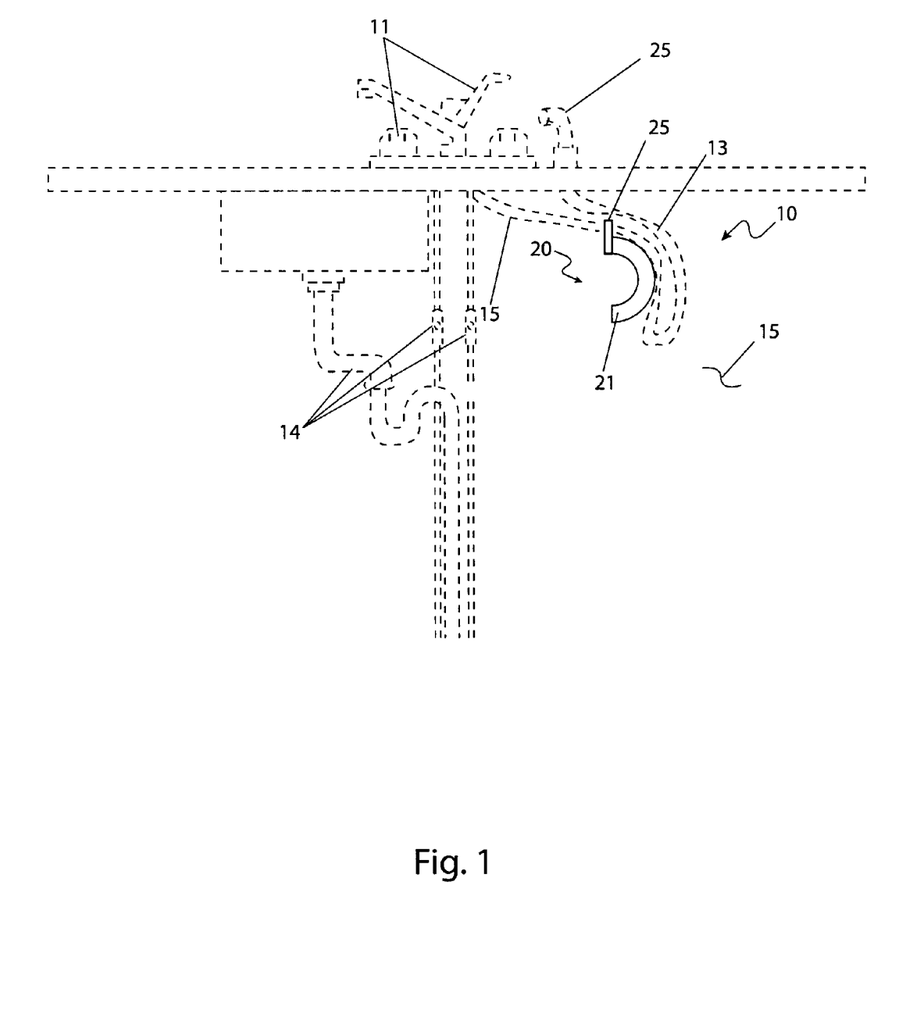
FIG. 1 is an environmental view of a retention clip for a spray wand hose 10, according to a preferred embodiment of the present invention.

Referring now to FIG. 1, an environmental view of the device 10, according to the preferred embodiment of the present invention, is disclosed. As a spray wand 12 is lifted and retracted from the faucet 11 the spray wand hose 13 has a tendency to loop around the plumbing 14 which causes a user to have to untangle the spray wand hose 13 from the plumbing 14. The device 10 generally comprises a retainer 20 and a mount 30. The device 10 enables the spray wand hose 13 to rest around the device 10 which prohibits the spray wand hose 13 from becoming entangled with the plumbing 14. The device 10 is preferably fabricated from a durable plastic material, yet other materials may be utilized without limiting the scope of the device 10.

Figure 2:
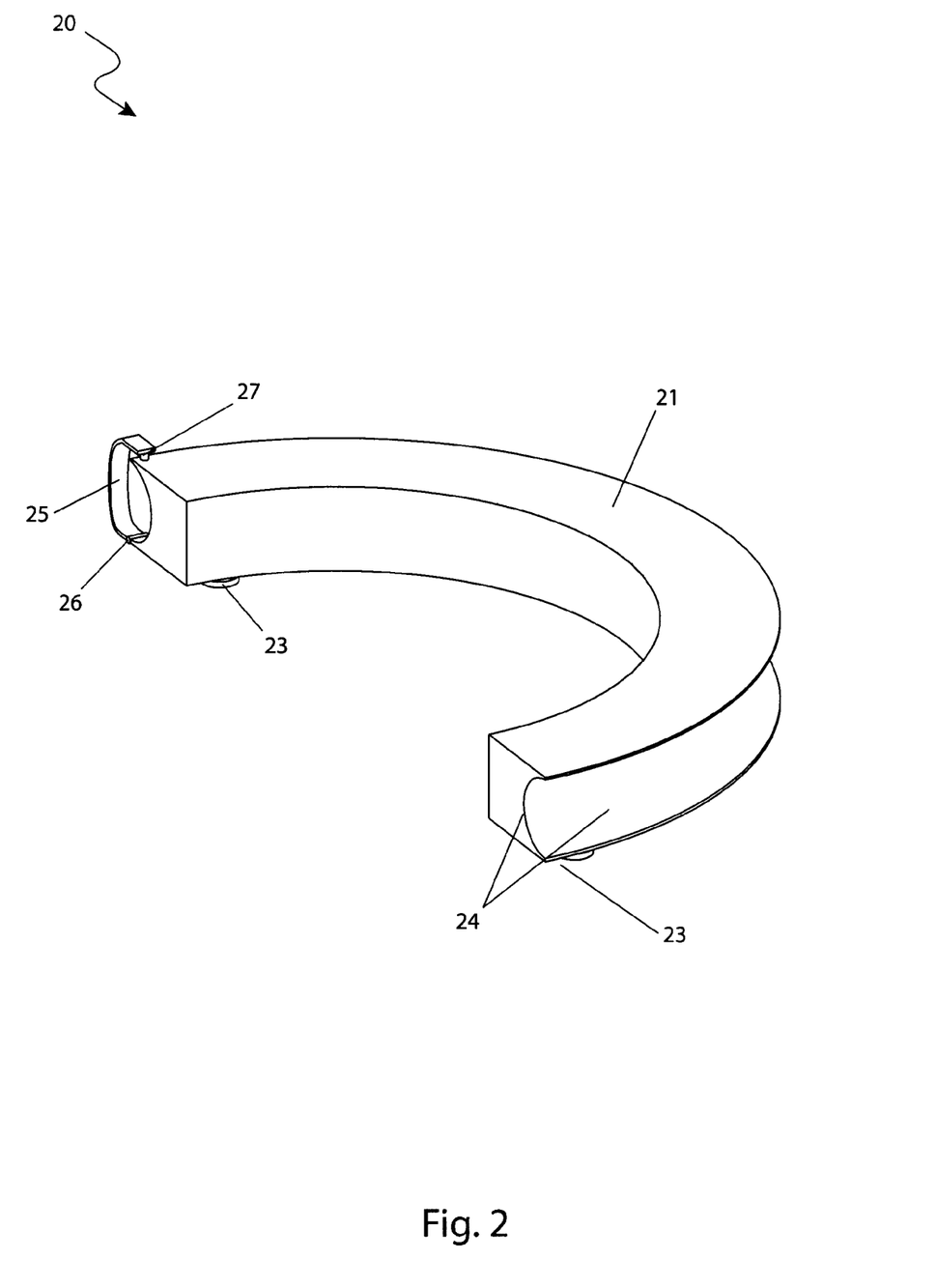
FIG. 2 is a perspective view of a retainer 20, according to a preferred embodiment of the present invention.
Figure 3:
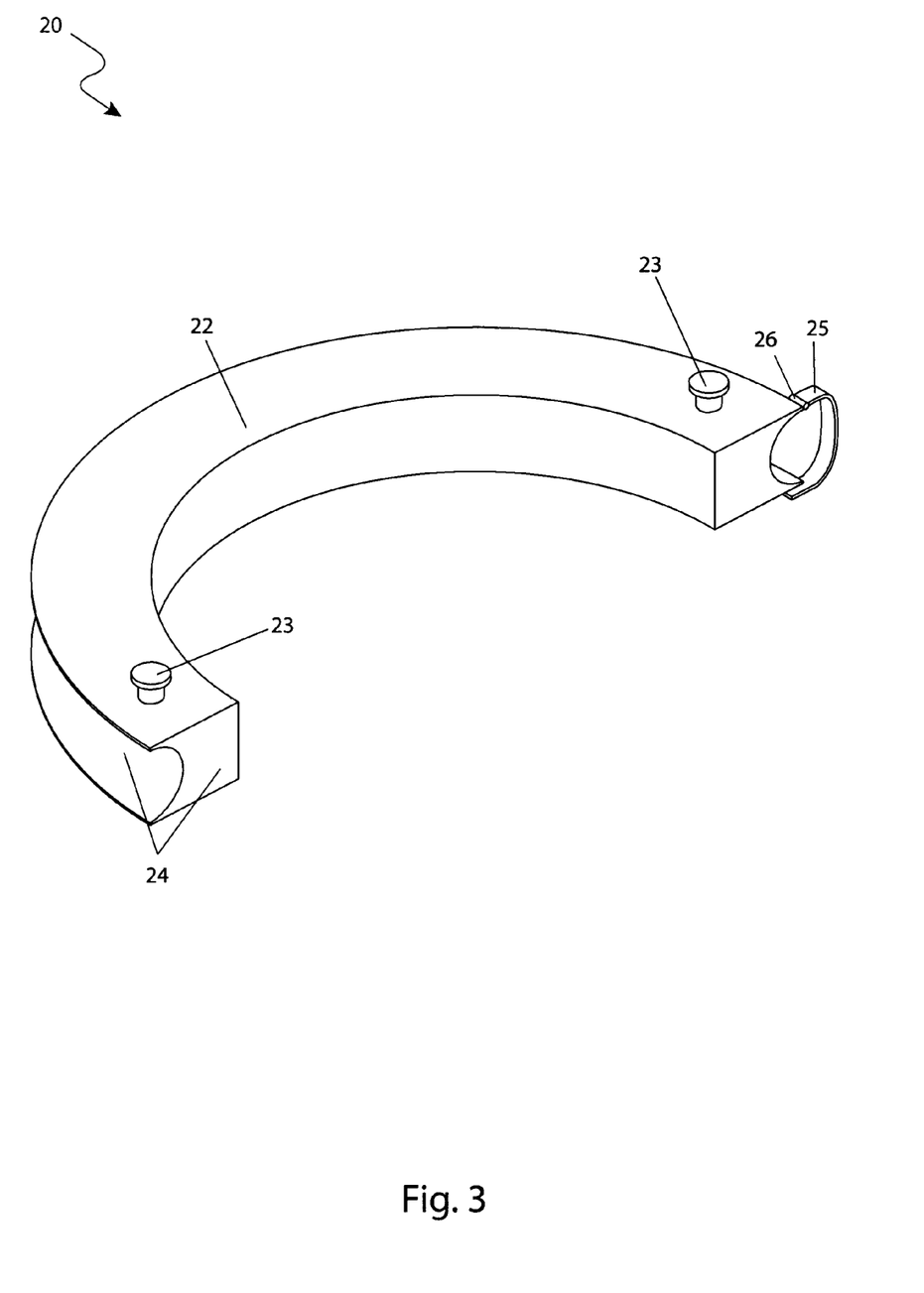
FIG. 3 is an opposing perspective view of the retainer 20, according to a preferred embodiment of the present invention.
Figure 4A:
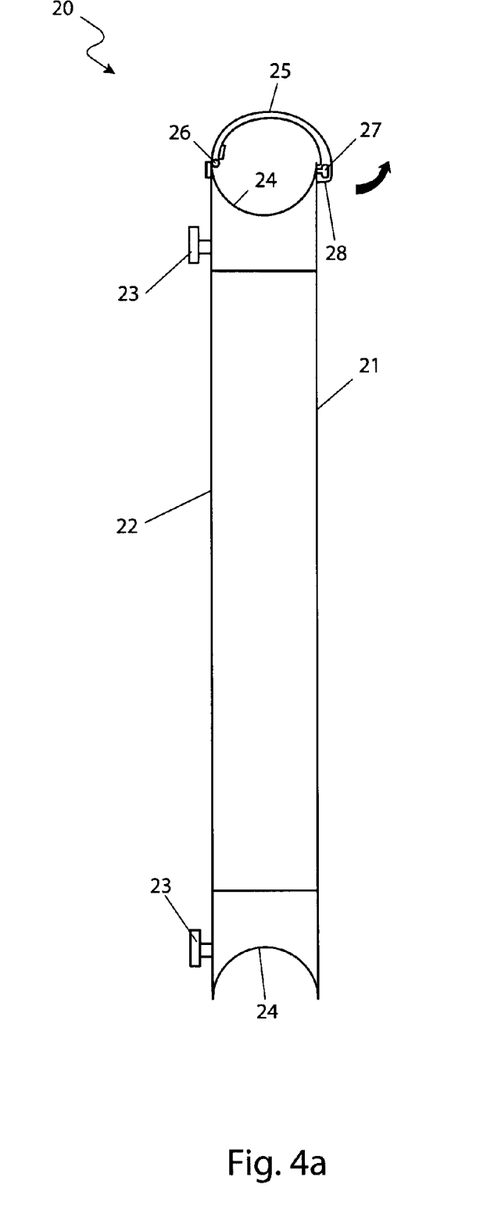
FIG. 4a is a front view of the retainer 20 depicting a latch 25 in a closed state, according to a preferred embodiment of the present invention.
Figure 4B:
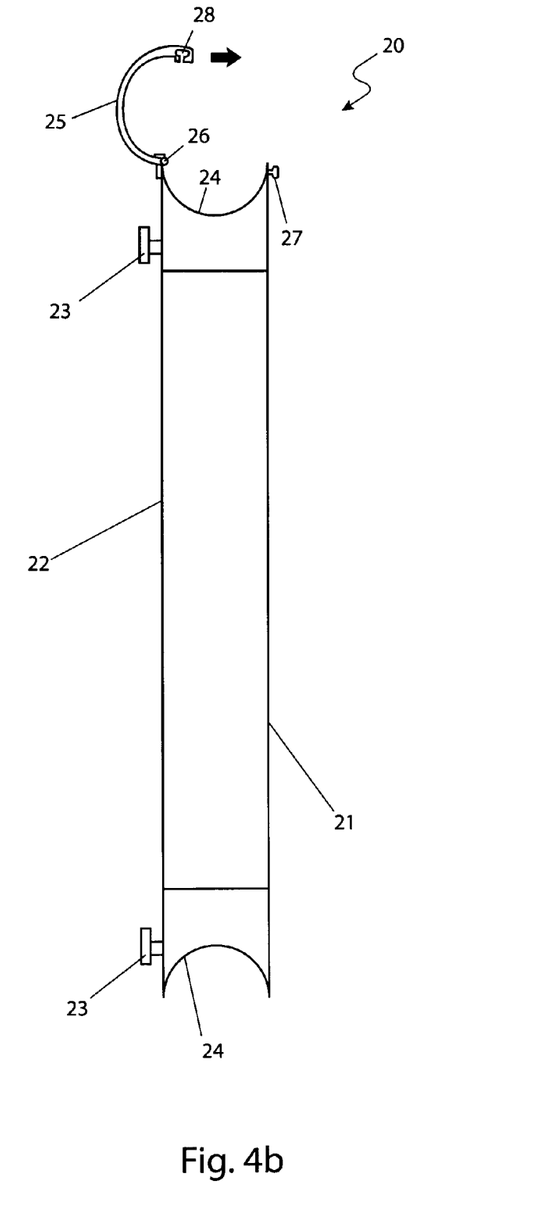
FIG. 4b is another front view of the retainer 20 depicting the latch 25 in an open state, according to a preferred embodiment of the present invention.
Figure 5:
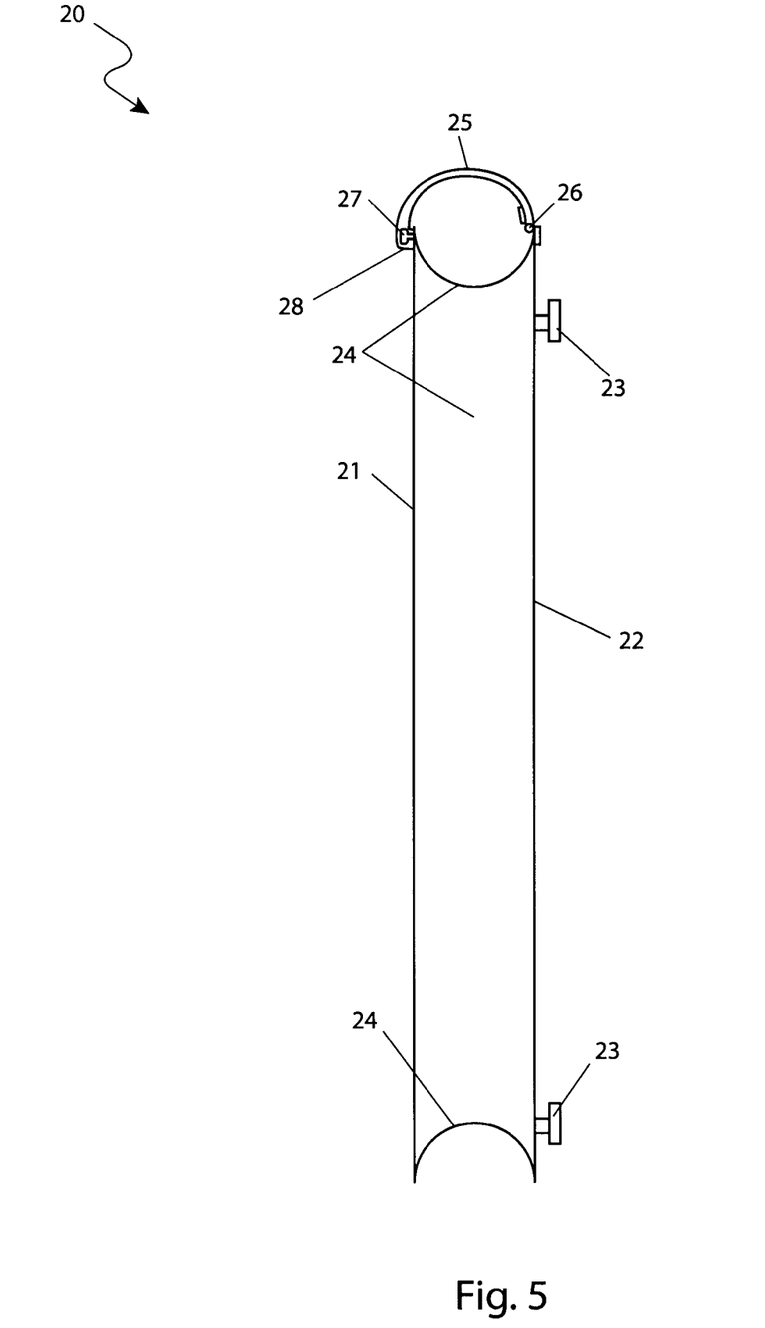
FIG. 5 is a rear view of the retainer 20, according to a preferred embodiment of the present invention.

Referring now to FIG. 2 through FIG. 5, various views of the device 10, according to the preferred embodiment of the present invention, are disclosed. FIG. 2 depicts a perspective view of the retainer 20, FIG. 3 depicts an opposing perspective view of the retainer 20, FIG. 4a depicts a front view of the retainer 20 further depicting the latch 25 in the closed state, FIG. 4b depicts another front view of the retainer 20 further depicting the latch 25 in the open state, and FIG. 5 depicts a rear view of the retainer 20. The retainer 20 comprises a semi-circular form which covers approximately ninety degrees (90°) to one-hundred-eighty degrees (180°) of a circular arc. The preferred embodiment of the device 10 comprises a semi-circular form comprising a one-hundred-eighty degrees (180°) arc and for clarity of illustration will be presented as such, however, it is understood that other arc dimensions may be used without limiting the scope of the device 10. In use, an upper surface 21 of the retainer 20 would be facing toward the user and a lower surface 22 would be facing toward a mount 30 (see FIG. 6).

The device 10 comprises a thickness defined by an interior sidewall and an exterior sidewall. The surface of the exterior sidewall comprises a curved groove 24 which extends the entire outer length of its semi-circular form. The groove 24 guides the spray wand hose 13 and enables the spray wand hose 13 to rest therein. The diameter of the groove 24 is preferably slightly larger than the diameter of the spray wand hose 13, thereby enabling the spray wand hose 13 to rest within the groove 24. The lower surface 22 of the retainer 20 comprises a pair of posts 23 which enable the retainer 20 to engage a pair of key holes 33 on the mount 30 (see FIG. 8). Each post 23 is "T"-shaped and located on a distal and a proximal end which are integrally molded into the lower surface 22 of the retainer 20.

The device 10 further comprises at least one latch 25 on at least one terminating end side of the retainer 20. Although illustrated having a single latch on one end of the retainer 20, it is understood that in alternate embodiments the latch 25 may be configured in an opposing orientation to allow the device 10 to be used with various under cabinet plumbing 14 configurations. Preferably, the latch 25 is disposed at an upper most point of the curved retainer 20. Additionally, the device 10 may comprise a pair of opposing latches 25, having a latch 25 at each end of the curved retainer 20. The arcuate latch 25 provides a means to guide and secure the spray wand hose 13 to the retainer 20. The latch 25 pivotally opens and closes via a hinge 26 and encircles the hose 13 between the latch 25 and the groove 24. The hinge 26 is attached to the lower surface 22 via fasteners or through integral molding techniques. The hinge 26 allows for the pivoting of the latch 25 to an open state such that the spray wand hose 13 may be positioned within and for the pivoting of the latch 25 to a closed state such that the spray wand hose 13 is secured between the groove 24 and latch 25. Opposing the hinge 25 is a securing means to the latch 25 comprising a second post 27 and an aperture 28. The second post 27 comprises a "T"-shaped member which is integrally molded and protrudes from the upper surface 21. The aperture 28 is located on an underside surface of the latch 25 and engages the second post 27 to secure the latch 25 in the closed state using an interference fit connection.

Figure 6:
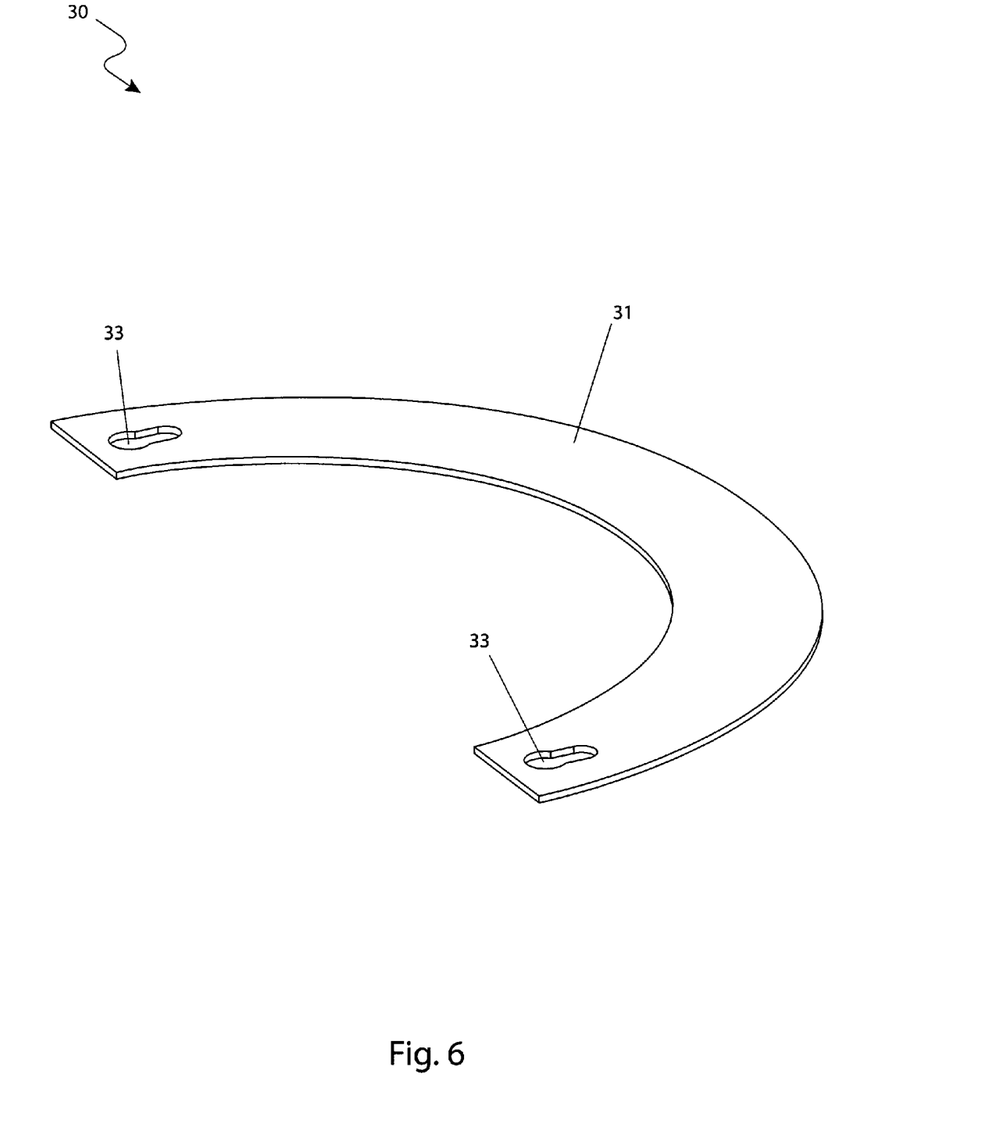
FIG. 6 is a perspective view of a mount 30, according to a preferred embodiment of the present invention.
Figure 7:
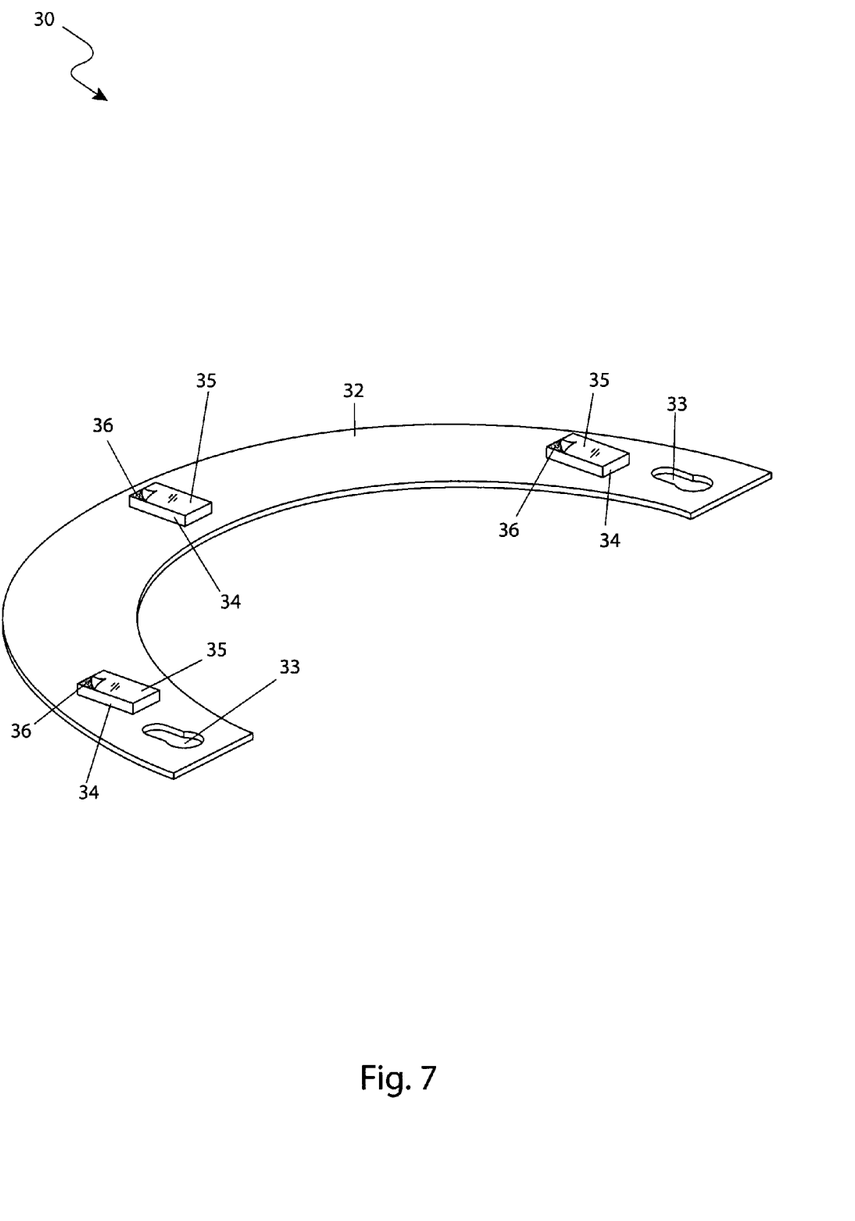
FIG. 7 is an opposing perspective view of the mount 30, according to a preferred embodiment of the present invention; and, FIG. 8 is a perspective view of the retention clip for a spray wand hose 10 depicting the retainer 20 and the mount 30 engaged, according to a preferred embodiment of the present invention.

Referring now to FIG. 6, a perspective view of the mount 30 and FIG. 7, an opposing perspective view of the mount 30, according to the preferred embodiment of the present invention, are disclosed. The mount 30 enables the device 10 to be secured to a desired vertical interior surface 15 where the plumbing 14 is located for the faucet 11. The mount 30 preferably comprises a semi-circular form which mirrors that of the retainer 20 and a slightly smaller width than that of the retainer 20 to provide proper engagement of the retainer 20 to the mount 30 allowing for pivoting motion of the latch 25. The mount 30 comprises at least one pair of key hole fasteners 33 on a distal and a proximal end of the mount 30 at prescribed locations to correspond to the pair of first posts 23. The key holes 33 receive the first post 23 which secures the retainer 20 to the mount 30. The lower surface 22 of the retainer 20 is positioned against a mount upper surface 31 for mounting purposes. The mount 30 depicts the preferred embodiment which generally matches the outline of the retainer 20 in order to provide a minimal footprint on the interior cabinet mounting surface, however, it can be appreciated that the mount 30 may comprise various shapes which can be attached the to mounting surface and to which the retainer 20 can be connected.

A mount lower surface 32 comprises a plurality of adhesive foam pads 34 which are utilized for removably securing the mount 30 to the desired vertical surface. The adhesive foam pads 34 are secured to the mount lower surface 32 via integral molding or adhesive. Each adhesive foam pad 34 comprises a protective cover 35 and an adhesive surface 36. The protective cover 35 is comprised of a non-stick substrate material such as wax paper, which allows the adhesive foam pads 34 to remain tacky before securing to the desired vertical surface 15. The protective cover 35 is peeled away from the adhesive foam pads 34 to reveal an adhesive surface 36 which secures the mount 30 to the desired vertical interior surface 15. Each adhesive foam pad 34 is an appropriate thickness to provide a suitable standoff as to allow the posts 23 to be inserted into each respective key hole 33 and an appropriate width to correspond to the width of the mount 30.

Figure 8:
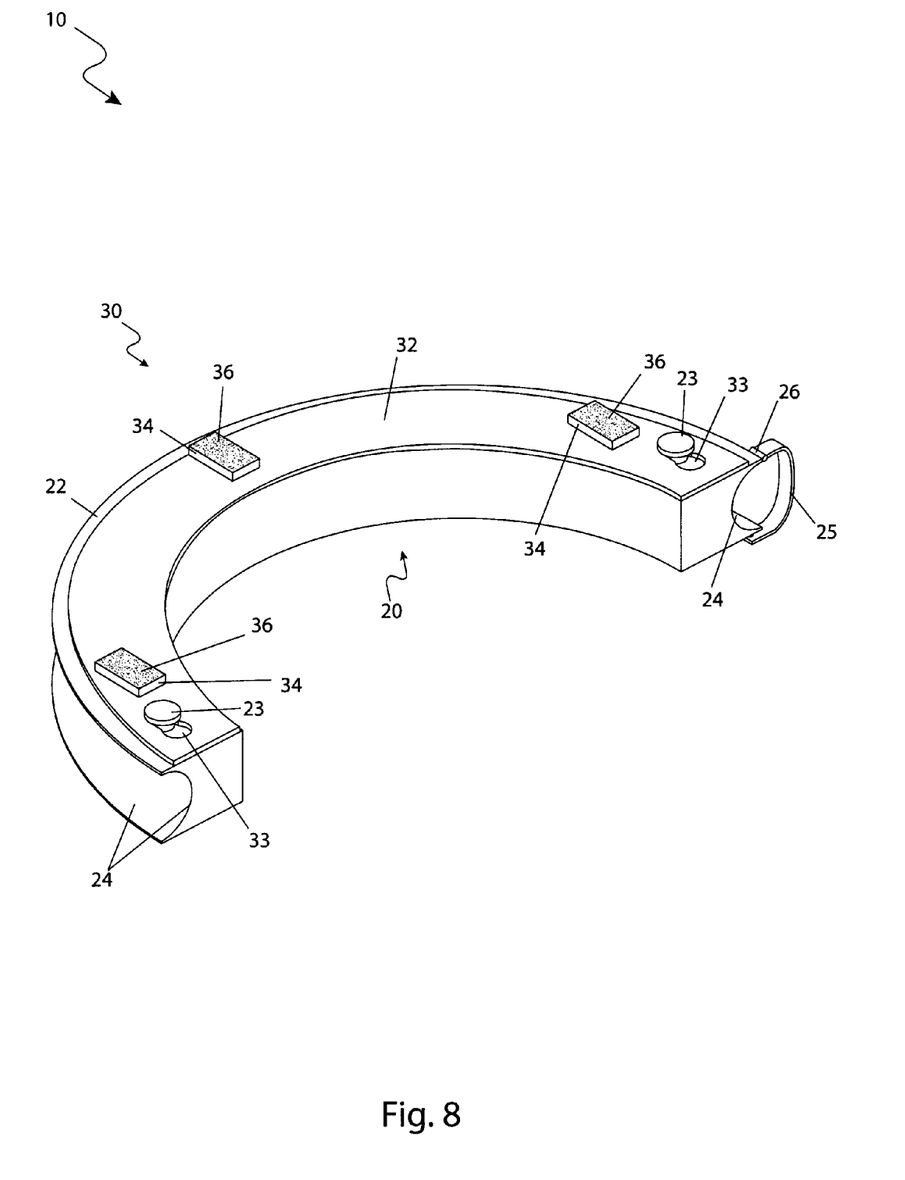

Referring now to FIG. 8, a perspective view of the device 10 depicting the retainer 20 and the mount 30 engaged, according to the preferred embodiment of the present invention, is disclosed. FIG. 8 depicts each post 23 as inserted into each key hole 33 and the protective covers 35 removed from each adhesive foam pads 34. The mount 30 is positioned on the lower surface 22 of the retainer 20 with the securing means of the latch 25 unobstructed to enable the latch 25 to be positioned in an open or closed state as necessary. In use, the user secures the adhesive foam pads 34 to the desired vertical interior surface 15 below the faucet 11 nearest to the spray wand hose 13. The height of the adhesive foam pads 34 enable the posts 23 to be inserted into the largest diameter of the key hole 33 and to be slid to the narrowest portion of the key hole 33 which secures the retainer 20 to the mount 30. The retainer 20 is able to be removed from the mount 30 as necessary by disengaging the posts 23 from the key holes 33.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the device 10, it would be installed as indicated in FIGS. 1 through 8.

The method of installing and utilizing the device 10 may be achieved by performing the following steps: acquiring the device 10; removing the protective cover 35 from each adhesive foam pads 34 on the mount 30, thus revealing the adhesive surface 36; adhering the adhesive surface 36 to a desired vertical interior surface 15 near the spray wand hose 13, thereby suspending the mount 30; engaging the posts 23 with a respective key hole 33 with the latch 25 upright; disengaging the second post 27 from the aperture 28 and pivoting about the hinge 26 to open the latch 25; routing the spray wand hose 13 in the groove 24 of the retainer 20; pivoting the latch 25 about the hinge 26 and engaging the second post 27 with the aperture 18 to secure the spray wand hose 13 with the latch 15; utilizing the spray wand 12 as usual and enabling the spray wand hose 13 to move within the groove 24; and, effectively controlling sprayer wand hoses 13 under faucets 11 in a manner which is quick, easy, and effective.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A retention clip device for a spray wand hose comprising:
   a generally curved retainer for retaining a spray wand hose in a position away from under-sink plumbing to avoid entanglement with said plumbing as said spray wand hose is extended and returned; and,
   a mount secured to a vertical under-sink surface for removably attaching said retainer;
   wherein said retainer further comprises an upper surface, a lower surface, an interior sidewall, and an exterior sidewall;
   wherein said mount further comprises a flat member having an upper surface and a lower surface; and,
   wherein said exterior sidewall further comprises an inwardly curved groove for receiving said spray wand hose.

2. The device of claim 1, wherein said retainer further comprises at least two mounting posts protruding from said lower surface; and,
   said mount further comprises at least two mounting apertures for removably receiving said mounting posts.

3. The device of claim 2, wherein each of said mounting apertures further comprises a keyhole aperture having a larger diameter upper section and a smaller diameter lower section;
   wherein each of said mounting posts comprise a shaft and a head; and, wherein said head is suitably sized to fit within said keyhole aperture upper section and said shaft is suitably sized to fit within said keyhole aperture lower section.

4. The device of claim 3, wherein said shaft is slightly longer than a thickness of said mount, such that said head contacts said mount lower surface.

5. The device of claim 4, wherein said mount further comprises a plurality of adhesive foam pads disposed on said mount lower surface for adhering to said vertical under-sink surface.

6. The device of claim 5, wherein said plurality of adhesive foam pads each further comprises a thickness slightly larger than said mounting post head.

7. The device of claim 6, wherein said retainer further comprises at least one latch disposed on an end portion for retaining said spray wand hose to said retainer within said groove;
wherein said latch spans from said retainer upper surface to said retainer lower surface over said groove.

8. The device of claim 7, wherein said latch is pivotably connected to said retainer by a hinge connection.

9. The device of claim 8, wherein said latches further comprises a latching post protruding from said retainer upper surface and a latching aperture opposite said hinge connection;
wherein a top of said latching post insertingly engages said latching aperture to secure said latch in a close position.

10. The device of claim 9, wherein said mount further comprises a curved-shape matching said retainer lower surface.

11. The device of claim 10, wherein said retainer further comprises an arc spanning at least ninety degrees.

12. The device of claim 10, wherein said retainer further comprises an arc spanning one hundred-eighty degrees.

13. A retention clip device for a spray wand hose comprising:
a generally curved retainer for retaining a spray wand hose in a position away from under-sink plumbing to avoid entanglement with said plumbing as said spray wand hose is extended and returned, said retainer further comprising an upper surface, a lower surface, an interior sidewall, and an exterior sidewall; and,
a generally curved mount secured to a vertical under-sink surface for removably attaching said retainer, said mount further comprising a flat member having an upper surface and a lower surface;
wherein said exterior sidewall further comprises an inwardly curved groove for receiving said spray wand hose.

14. The device of claim 13, wherein said retainer further comprises at least two mounting posts protruding from said lower surface; and,
said mount further comprises at least two a keyhole mounting apertures for removably receiving said mounting posts, said mounting apertures having a larger diameter upper section and a smaller diameter lower section;
wherein each of said mounting posts comprise a shaft and a head; and,
wherein said head is suitably sized to fit within said keyhole aperture upper section and said shaft is suitably sized to fit within said keyhole aperture lower section.

15. The device of claim 14, wherein said retainer further comprises an upper latch disposed on an upper end portion for retaining said spray wand hose to said retainer within said groove;
wherein said upper latch spans from said retainer upper surface to said retainer lower surface over said groove;
wherein said upper latch is pivotably connected to said retainer by a hinge connection;
wherein said upper latches further comprises an upper latching post protruding from said retainer upper surface and an upper latching aperture opposite said hinge connection; and,
wherein a top of said upper latching post insertingly engages said upper latching aperture to secure said upper latch in a close position.

16. The device of claim 15, wherein said mount further comprises a plurality of adhesive foam pads disposed on said mount lower surface for adhering to said vertical under-sink surface;
wherein said plurality of adhesive foam pads each further comprises a thickness slightly larger than said mounting post head.

17. The device of claim 16, wherein said retainer further comprises an arc spanning at least ninety degrees; and,
wherein said mount further comprises a curved-shape matching said retainer lower surface.

18. The device of claim 17, wherein said retainer further comprises a lower latch disposed on a lower end for retaining said spray wand hose to said retainer within said groove;
wherein said lower latch spans from said upper surface to said lower surface over said groove;
wherein said lower latch is pivotably connected to said retainer by a hinge connection;
wherein said lower latch further comprises a lower latching post protruding from said retainer upper surface and a lower latching aperture opposite said hinge connection; and,
wherein a top of said latching post insertingly engages said latching aperture to secure said latch in a close position.

19. A method of retaining a spray wand hose in a position away from under-sink plumbing to avoid entanglement with said under-sink plumbing as said spray wand hose is extended and returned, said method comprising the steps of:
providing a retention clip device for a spray wand hose comprising a generally curved retainer having an upper surface, a lower surface, an interior sidewall, and an exterior sidewall further comprising an inwardly curved groove for receiving said spray wand hose, an upper latch disposed on an upper end portion for retaining said spray wand hose to said retainer within said groove, and at least two mounting posts protruding from said lower surface, and a generally curved flat mount secured to a vertical under-sink surface having an upper surface, a lower surface, at least two a keyhole mounting apertures for removably receiving said mounting posts, and a plurality of adhesive foam pads disposed on said mount lower surface for adhering to a vertical under-sink surface;
adhering said mount to a preselected location upon said vertical under-sink surface;
removably mounting said retainer to mount by aligning and insertingly engaging said mounting posts with said mounting apertures;
unlatching said latch;
positioning said spray wand hose within said groove;
latching said latch, thus securing said spray wand hose to said retainer; and,
extending and returning said spray wand.

* * * * *